US012575705B2

(12) United States Patent (10) Patent No.: US 12,575,705 B2
Jarmesta et al. (45) Date of Patent: Mar. 17, 2026

(54) DEBRIS BLOWER

(71) Applicant: HUSQVARNA AB, Huskvarna (SE)

(72) Inventors: Urban Jarmesta, Jönköping (SE);
Tobias Nyberg, Huskvarna (SE); Jonas Haglind, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 364 days.

(21) Appl. No.: 17/786,899

(22) PCT Filed: Dec. 3, 2020

(86) PCT No.: PCT/EP2020/084393
§ 371 (c)(1),
(2) Date: Jun. 17, 2022

(87) PCT Pub. No.: WO2021/122019

PCT Pub. Date: Jun. 24, 2021

(65) Prior Publication Data

US 2023/0032953 A1 Feb. 2, 2023

(30) Foreign Application Priority Data

Dec. 18, 2019 (SE) .................................... 1951487-6

(51) Int. Cl.
*A47L 5/14* (2006.01)
*A01G 20/47* (2018.01)
(Continued)

(52) U.S. Cl.
CPC ................ *A47L 5/14* (2013.01); *A01G 20/47* (2018.02); *A47L 9/2884* (2013.01);
(Continued)

(58) Field of Classification Search
None
See application file for complete search history.

(56) References Cited

U.S. PATENT DOCUMENTS 4,884,314 A 12/1989 Miner et al.
9,016,412 B2 4/2015 Janarthanam et al.
(Continued)

FOREIGN PATENT DOCUMENTS

CN 104183889 A 12/2014
CN 108778083 A 11/2018
(Continued)

OTHER PUBLICATIONS

International Search Report and Written Opinion for PCT Application No. PCT/EP2020/084393, dated Feb. 16, 2021.
(Continued)

*Primary Examiner* — David S Posigian
*Assistant Examiner* — Dana Lee Poon
(74) *Attorney, Agent, or Firm* — Burr & Forman

(57) ABSTRACT

A debris blower (1) is disclosed comprising a fan housing (3), a fan (5) configured to generate an airflow through the fan housing (3), an electric motor (7) configured to power the fan (5), and a first battery accommodation space (9) configured to accommodate a battery unit (10) for supply of electricity to the electric motor (7). The debris blower (1) further comprises a first air cooling channel (11) fluidly connecting the first battery accommodation space (9) and the fan housing (3).

18 Claims, 4 Drawing Sheets

(51) Int. Cl.
| | |
|---|---|
| *A47L 9/28* | (2006.01) |
| *E01H 1/08* | (2006.01) |
| *F04D 25/06* | (2006.01) |
| *H01M 10/6235* | (2014.01) |

(52) U.S. Cl.
CPC ....... *E01H 1/0809* (2013.01); *F04D 25/0673* (2013.01); *H01M 10/6235* (2015.04)

(56) References Cited

U.S. PATENT DOCUMENTS

| | | | |
|---|---|---|---|
| 9,147,917 B2 | 9/2015 | Oh et al. | |
| 9,756,783 B2 * | 9/2017 | Nojiri | A01D 34/90 |
| 9,899,712 B2 | 2/2018 | Nagano et al. | |
| 10,118,502 B2 * | 11/2018 | Yokote | H01M 10/663 |
| 11,326,610 B2 * | 5/2022 | Naka | F04D 25/08 |
| 11,771,018 B2 * | 10/2023 | Koide | A47L 5/14 |
| | | | 15/327.5 |
| 2004/0174138 A1 * | 9/2004 | Moores, Jr. | H01M 10/6563 |
| | | | 320/114 |
| 2004/0261377 A1 * | 12/2004 | Sung | H01M 10/6566 |
| | | | 55/385.3 |
| 2005/0155177 A1 * | 7/2005 | Baer | A47L 9/2873 |
| | | | 15/353 |
| 2007/0202792 A1 | 8/2007 | Shimizu et al. | |
| 2009/0241285 A1 | 10/2009 | Hinklin et al. | |
| 2012/0234412 A1 * | 9/2012 | Prager | A01G 20/47 |
| | | | 137/565.01 |
| 2014/0050600 A1 | 2/2014 | Kodato et al. | |
| 2014/0072845 A1 | 3/2014 | Oh et al. | |
| 2016/0108924 A1 | 4/2016 | Conrad et al. | |
| 2016/0198636 A1 * | 7/2016 | Poole | A01G 20/47 |
| | | | 15/327.5 |
| 2017/0021489 A1 * | 1/2017 | Bylund | F04D 19/002 |
| 2018/0131057 A1 * | 5/2018 | Takeuchi | H01M 10/6563 |
| 2018/0175465 A1 | 6/2018 | Choi et al. | |
| 2019/0029191 A1 | 1/2019 | Poole et al. | |

FOREIGN PATENT DOCUMENTS

| | | |
|---|---|---|
| JP | 5329836 B2 | 10/2013 |
| JP | 2014148951 A1 | 8/2014 |
| JP | 2015141890 A1 | 8/2015 |
| JP | 6190644 B2 | 8/2017 |
| WO | 2014119175 A1 | 8/2014 |
| WO | 2018170591 A1 | 9/2018 |
| WO | 2018224985 A1 | 12/2018 |

OTHER PUBLICATIONS

Swedish Search Report in Swedish patent application No. 1951487-6, dated Jul. 2, 2020.

\* cited by examiner

1

29

34

35

32

9

14

15

12

4

6

DEBRIS BLOWER

TECHNICAL FIELD

The present disclosure relates to a battery powered debris blower.

BACKGROUND

A debris blower is a tool that propels air out of a nozzle to move debris, such as leaves, grass cuttings, dust, and the like. Debris blowers are sometimes referred to as leaf blowers, even though they can be used for various purposes. Debris blowers comprise a fan powered by a motor, such as an electric motor or a combustion engine. Debris blowers are typically self-contained handheld units or backpack mounted units with a handheld nozzle. Some debris blowers can be operated in an alternative operational mode causing a suction at the nozzle instead of a flow of air out from the nozzle. Such debris blowers are sometimes referred to as a debris blower/vacuum, or simply debris vacuum or leaf vacuum.

Electrically powered debris blowers, i.e. debris blowers comprising a fan powered by an electric motor, generally generate less noise, vibration, and emissions as compared to debris blowers comprising a fan powered by a combustion engine. The fan of a debris blower operates at a high power level and the driving of the fan of a debris blower requires a lot of energy. Therefore, the supply of electricity to the electric motor is a challenge associated with electrically powered debris blowers. Usually, an electrically powered debris blower comprises one or more batteries configured to supply electricity to the electric motor of the debris blower. Such debris blowers may be referred to as battery powered debris blowers. Battery powered debris blowers are simple to use because they circumvent the need for a power cord to power the electric motor. However, the high power level of the electric motor puts demands on such one or more batteries. That is, the one or more batteries must preferably be designed to be able to supply the electrical current needed. Moreover, the high electrical currents needed for powering the electric motor generates a lot of heat during operation of the debris blower.

In addition, generally, on today's consumer market, it is an advantage if products, such as debris blowers, comprise different features and functions while the products have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a debris blower comprising a fan housing, a fan configured to generate an airflow through the fan housing, an electric motor configured to power the fan, and a first battery accommodation space configured to accommodate a battery unit for supply of electricity to the electric motor. The debris blower further comprises a first air cooling channel fluidly connecting the first battery accommodation space and the fan housing.

Since the debris blower comprises a first air cooling channel fluidly connecting the first battery accommodation space and the fan housing, an efficient cooling can be provided of the first battery accommodation space and a battery unit arranged in the first battery accommodation space. That is, since the first air cooling channel fluidly connects the first battery accommodation space and the fan housing, an air flow can be provided through the first battery accommodation space, using the airflow through the fan housing during operation of the debris blower, to provide a cooling of the battery unit in a simple, efficient, and reliable manner.

Furthermore, since the airflow through the fan housing can be utilized to cool the first battery accommodation space and a battery unit arranged therein, the first battery accommodation space and a battery unit can be cooled in an energy efficient manner.

In addition, since the debris blower is capable of obtaining an efficient cooling of the first battery accommodation space and a battery unit arranged therein, an overheating of the battery unit can be avoided. An overheating of a battery unit may damage the battery unit or may at least reduce the lifespan thereof. Accordingly, since the debris blower is capable of obtaining an efficient cooling of the battery unit, such damages, or reductions in lifespan, of battery units can be avoided.

Moreover, a simple and cost-efficient solution is provided for cooling the first battery accommodation space and a battery unit arranged therein, in a manner circumventing the need for a further arrangement for cooling the first battery accommodation space and the battery unit, such as a separate fan, or the like. Accordingly, a debris blower is provided capable of achieving an efficient cooling of the first battery accommodation space and a battery unit arranged therein, while the debris blower has conditions and characteristics suitable for being manufactured and assembled in a cost-efficient manner.

Accordingly, a debris blower is provided overcoming, or at least alleviating, at least some of the above-mentioned problems and drawbacks. As a result, the above-mentioned object is achieved.

Optionally, the first air cooling channel comprises a first end portion positioned in the fan housing to provide an ejection of air through the first end portion during operation of the blower. Thereby, an air flow can be provided through the first air cooling channel in a direction from the first battery accommodation space towards the first end portion in a further energy efficient manner, utilizing an ejection effect obtained by the airflow through the fan housing. Moreover, due to these features, the air flow through the first air cooling channel can be obtained without significantly disturbing the airflow through the fan housing and without causing a significant pressure drop therein. Accordingly, due to these features, the air flow through the first air cooling channel can be obtained without significantly reducing the operational efficiency of the debris blower.

Optionally, the fan is arranged in the fan housing, and wherein the first air cooling channel comprises a first end portion positioned at a suction side of the fan housing. Thereby, an air flow can be provided through the first air cooling channel in a direction from the first battery accommodation space towards the first end portion in a simple, efficient, and reliable manner.

Optionally, the fan is configured to generate an airflow having a flow direction through the fan housing, wherein the first air cooling channel comprises a first end portion positioned in the fan housing, and wherein the first end portion has an opening direction angled relative to the flow direction to provide a flow of air through the first air cooling channel during operation of the blower. Thereby, an air flow through the first air cooling channel can be obtained without significantly disturbing the airflow through the fan housing and without causing a significant pressure drop therein. Accordingly, due to these features, the air flow through the first air cooling channel can be obtained without significantly reducing the operational efficiency of the debris blower.

Optionally, an angle between the flow direction and the opening direction of the first end portion is within the range of 5 to 80 degrees, or within the range of 25 to 65 degrees. Thereby, an air flow through the first air cooling channel can be obtained without significantly disturbing the airflow through the fan housing and without causing a significant pressure drop therein. Accordingly, due to these features, the air flow through the first air cooling channel can be obtained without significantly reducing the operational efficiency of the debris blower.

Optionally, the blower comprises a first battery unit removably arrangeable at a predetermined orientation in the first battery accommodation space to supply electricity to the electric motor. Thereby, a user friendly debris blower is provided capable of obtaining an efficient and reliable cooling of the first battery unit.

Optionally, the first air cooling channel comprises a second end portion at the first battery accommodation space, and wherein the first battery unit is a battery pack comprising a battery housing and a number of battery cells arranged in the battery housing, wherein the battery housing comprises one or more openings configured to superimpose the second end portion when the first battery unit is arranged at the predetermined orientation in the first battery accommodation space. Thereby, a debris blower is provided capable of obtaining an efficient cooling of the battery cells of the first battery unit. This because an air flow can be obtained around the battery cells of the first battery unit to the second end portion of the first air cooling channel via the one or more openings of the battery housing.

Optionally, the battery housing comprises one or more further openings arranged at a distance from the one or more openings being configured to superimpose the second end portion. Thereby, a debris blower is provided capable of obtaining a further improved cooling of the battery cells of the first battery unit. This because an air flow can be obtained through the one or more further openings into the housing and around the battery cells and into the second end portion of the first air cooling channel via the one or more openings of the battery housing.

Optionally, the blower comprises a second battery accommodation space configured to accommodate a battery unit for supply of electricity to the electric motor, and a second air cooling channel fluidly connecting the second battery accommodation space and the fan housing. Thereby, a debris blower is provided capable of obtaining a cooling of the second battery accommodation space and a battery unit arranged in the second battery accommodation space in a simple, efficient, and reliable manner using the airflow through the fan housing.

Optionally, the first battery unit is removably arrangeable at a predetermined orientation in the second battery accommodation space to supply electricity to the electric motor. Thereby, a user-friendly debris blower is provided in which a user can arrange the same type of battery units in the first and second battery accommodation spaces.

Optionally, the second air cooling channel is separate from the first air cooling channel. Thereby, a debris blower is provided in which equal and stable flow rates of air can be provided between the first and second air cooling channels which are independent of the number of battery units currently used. Accordingly, due to these features, an equal and stable cooling can be provided between the first and second battery accommodation spaces in a manner being independent of the number of battery units currently used.

Optionally, the second air cooling channel comprises a first end portion positioned in the fan housing to provide an ejection of air through the first end portion during operation of the blower. Thereby, an air flow can be provided through the second air cooling channel in a direction from the second battery accommodation space towards the first end portion of the second air cooling channel in a further energy efficient manner, utilizing an ejection effect obtained by the airflow through the fan housing. Moreover, due to these features, the air flow through the second air cooling channel can be obtained without significantly disturbing the airflow through the fan housing and without causing a significant pressure drop therein. Accordingly, due to these features, the air flow through the second air cooling channel can be obtained without significantly reducing the operational efficiency of the debris blower.

Optionally, the fan is arranged in the fan housing, and wherein the second air cooling channel comprises a first end portion positioned at a suction side of the fan housing. Thereby, an air flow can be provided through the second air cooling channel in a direction from the second battery accommodation space towards the first end portion of the second air cooling channel in a simple, efficient, and reliable manner Optionally, the fan is configured to generate an airflow having a flow direction through the fan housing, wherein the second air cooling channel comprises a first end portion positioned in the fan housing, and wherein the first end portion has an opening direction angled relative to the flow direction to provide a flow of air through the second air cooling channel during operation of the blower. Thereby, an air flow through the second air cooling channel can be obtained without significantly disturbing the airflow through the fan housing and without causing a significant pressure drop therein. Accordingly, due to these features, the air flow through the second air cooling channel can be obtained without significantly reducing the operational efficiency of the debris blower.

Optionally, an angle between the flow direction and the opening direction of the second end portion is within the range of 5 to 80 degrees, or within the range of 25 to 65 degrees. Thereby, an air flow through the second air cooling channel can be obtained without significantly disturbing the airflow through the fan housing and without causing a significant pressure drop therein. Accordingly, due to these features, the air flow through the second air cooling channel can be obtained without significantly reducing the operational efficiency of the debris blower.

Optionally, the blower comprises a second battery unit removably arrangeable at a predetermined orientation in the second battery accommodation space to supply electricity to the electric motor. Thereby, a user-friendly debris blower is provided capable of obtaining an efficient cooling of the second battery accommodation space and the second battery unit.

Optionally, the second air cooling channel comprises a second end portion at the second battery accommodation space, and wherein the second battery unit is a battery pack comprising a battery housing and a number of battery cells arranged in the battery housing, wherein the battery housing comprises one or more openings configured to superimpose the second end portion of the second air cooling channel when the second battery unit is arranged at the predetermined orientation in the second battery accommodation space. Thereby, a debris blower is provided capable of obtaining an efficient cooling of the battery cells of the second battery unit. This because an air flow can be obtained around the battery cells to the second end portion of the second air cooling channel via the one or more openings of the battery housing.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
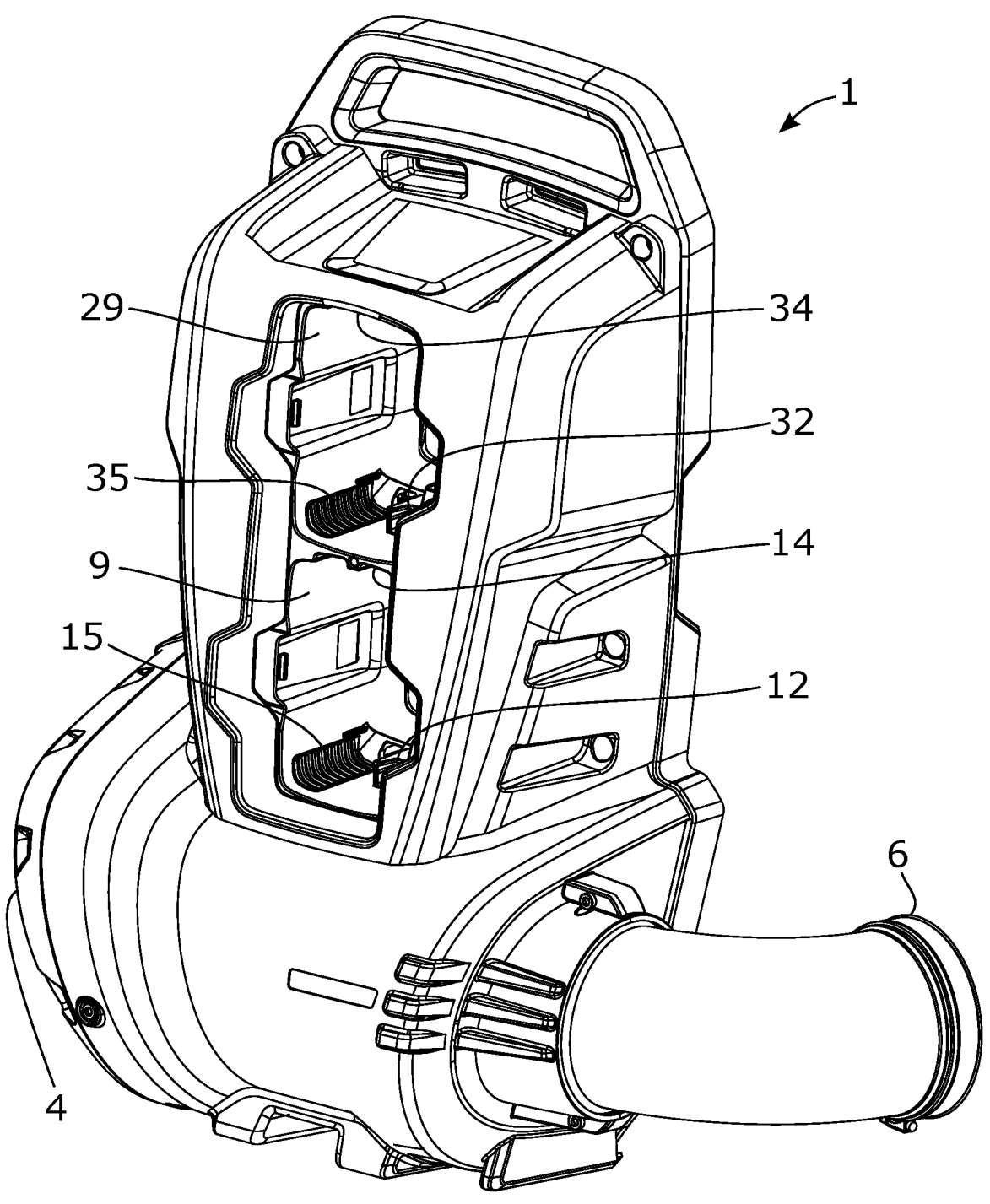
FIG. 1 illustrates a perspective view of a debris blower according to some embodiments of the present disclosure.

FIG. 1 illustrates a perspective view of a debris blower 1 according to some embodiments of the present disclosure. According to the illustrated embodiments, the debris blower is a self-contained backpack mounted debris blower 1. According to further embodiments, the debris blower, as referred to herein, may be another type of self-contained portable debris blower, such as a handheld debris blower.

As is further explained herein, the debris blower 1 is an electrically powered debris blower comprising a fan powered by an electric motor. The fan is configured to generate an airflow from an air inlet 4 to an air outlet pipe 6 of the debris blower 1. The debris blower 1 may comprise a nozzle unit with a handle, wherein the nozzle unit is arrangeable to the air outlet pipe 6 illustrated in FIG. 1. In this manner, a user can utilize the debris blower 1 for moving matter such as leaves, grass cuttings, dust, and the like by activating the debris blower 1 and directing the nozzle unit towards the matter. The nozzle unit is not illustrated in FIG. 1 for the reason of brevity and clarity.

According to the illustrated embodiments, the debris blower 1 comprises a first battery accommodation space 9 and a second battery accommodation space 29. Each of the first and second battery accommodation spaces 9, 29 is configured to accommodate a battery unit for supply electricity to the electric motor, as is further explained herein.

Figure 2:
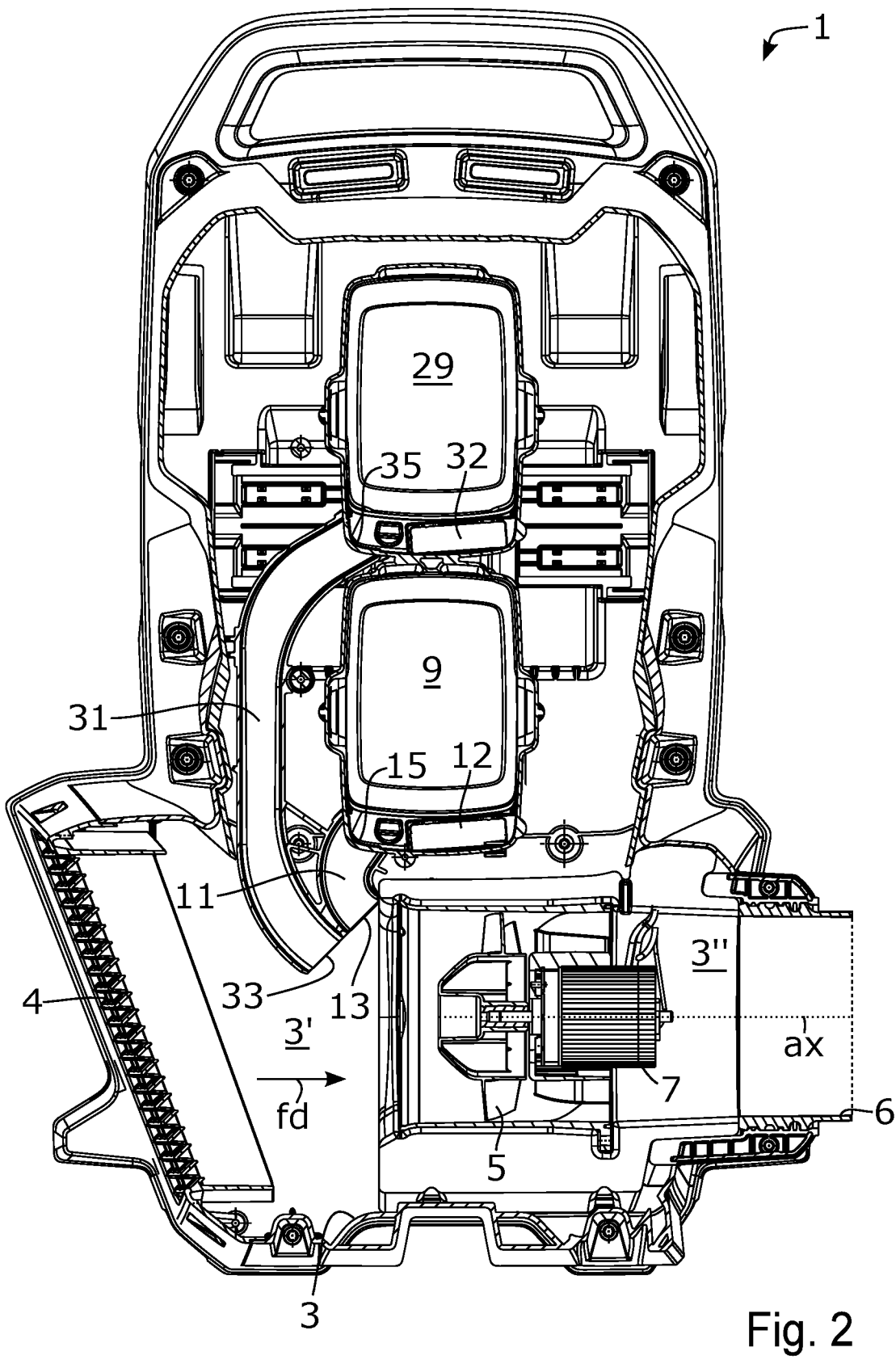
FIG. 2 illustrates a cross section through the debris blower illustrated in FIG. 1.

FIG. 2 illustrates a cross section through the debris blower 1 illustrated in FIG. 1. As indicated in FIG. 2, the debris blower 1 comprises a fan housing 3 and a fan 5 arranged in the fan housing 3. The fan 5 is configured to generate an airflow through the fan housing 3 in a direction from the air inlet 4 towards the air outlet pipe 6. Moreover, the debris blower 1 comprises an electric motor 7 configured to power the fan 5. According to the illustrated embodiments, the electric motor 7 is configured to power the fan 5 by rotating the fan 5 around a rotation axis ax. In FIG. 2, the cross section is made in a plane comprising the rotation axis ax. According to the illustrated embodiments, the fan 5 is configured to generate an airflow having a flow direction fd through the fan housing 3, wherein the flow direction fd is substantially parallel to the rotation axis ax of the fan 5.

In FIG. 2, the first and second battery accommodation spaces 9, 29 are indicated. As can be seen in FIG. 1 and FIG. 2, each of the first and second battery accommodation spaces 9, 29 comprises electrical contacts 12, 32 for connection to electrical contacts of a battery unit for supply of electricity to the electric motor 7.

As can be seen in FIG. 2, the debris blower 1 comprises first air cooling channel 11. The first air cooling channel 11 fluidly connects the first battery accommodation space 9 and the fan housing 3. That is, as indicated in FIG. 2, the first air cooling channel 11 comprises a first end portion 13 positioned in the fan housing 3 and a second end portion 15 positioned at the first battery accommodation space 9. In this manner, the airflow through the fan housing 3 can generate an airflow through the first air cooling channel 11 so as to provide a cooling of the first battery accommodation space 9 and a battery unit arranged therein, as is further explained herein.

According to the illustrated embodiments, the first end portion 13 is positioned in the fan housing 3 to provide an ejection of air through the first end portion 13 during operation of the blower 1, thus utilizing an ejection effect on the first end portion 13 of the first air cooling channel 11 obtained by the airflow through the fan housing 3. Accordingly, due to these features, an airflow is obtained through the first air cooling channel 11 in a direction from the first battery accommodation space 9 towards the first end portion 13. Since the ejection effect is utilized, the air flow through the first air cooling channel 11 is obtained without significantly disturbing the airflow through the fan housing 3 and without causing a significant pressure drop therein. Accordingly, due to these features, the air flow through the first air cooling channel 11 can be obtained without significantly reducing the operational efficiency of the debris blower 1.

Moreover, as can be seen in FIG. 2, according to the illustrated embodiments, the debris blower 1 comprises second air cooling channel 31. The second air cooling channel 31 fluidly connects the second battery accommodation space 29 and the fan housing 3. That is, as indicated in FIG. 2, the second air cooling channel 31 comprises a first end portion 33 positioned in the fan housing 3 and a second end portion 35 positioned at the second battery accommodation space 29. In this manner, the airflow through the fan housing 3 can generate an airflow through the second air cooling channel 31 so as to provide a cooling of the second battery accommodation space 29 and a battery unit arranged therein.

According to the illustrated embodiments, the first end portion 33 is positioned in the fan housing 3 to provide an ejection of air through the first end portion 33 during operation of the blower 1, thus utilizing an ejection effect on the first end portion 33 of the second air cooling channel 31 obtained by the airflow through the fan housing 3. Accordingly, due to these features, an airflow is obtained through the second air cooling channel 31 in a direction from the second battery accommodation space 29 towards the first end portion 33 of the second air cooling channel 31. Since the ejection effect is utilized, the air flow through the second air cooling channel 31 is obtained without significantly disturbing the airflow through the fan housing 3 and without causing a significant pressure drop therein. Accordingly, due to these features, the air flow through the second air cooling channel 31 can be obtained without significantly reducing the operational efficiency of the debris blower 1.

According to the illustrated embodiments, the second air cooling channel 31 is separate from the first air cooling channel 11. In this manner, equal and stable flow rates of air can be provided between the first and second air cooling channels 11, 31 which are independent of the number of battery units currently used. Accordingly, due to these features, an equal and stable cooling can be provided between the first and second battery accommodation spaces 9, 29 in a manner independent of the number of battery units currently used. That is, since the second air cooling channel 31 is separate from the first air cooling channel 11, the flow rate of air through the first air cooling channel 11 is independent of whether a battery unit is arranged in the second battery accommodation space 29, and vice versa.

Moreover, according to the illustrated embodiments, the second air cooling channel 31 is designed to provide a flow rate of air being equal to the flow rate of air through the first air cooling channel 11 when a battery unit is arranged in each of the first and second battery accommodation spaces 9, 29. In this manner, an equal cooling is provided of two battery units each arranged in a battery accommodation space 9, 29 of the debris blower 1.

According to the illustrated embodiments, the first end portions 13, 33 of the first and second air cooling channels 11, 31 are positioned at a suction side 3' of the fan housing 3. That is, according to the illustrated embodiments, the first end portions 13, 33 of the first and second air cooling channels 11, 31 are positioned upstream of the fan 5 seen in the flow direction fd. According to further embodiments of the present disclosure, one or both of the first end portions 13, 33 of the first and second air cooling channels 11, 31 may be positioned at a pressure side 3" of the fan housing 3, i.e. downstream of the fan 5 seen in the flow direction fd.

Figures 3, 4:
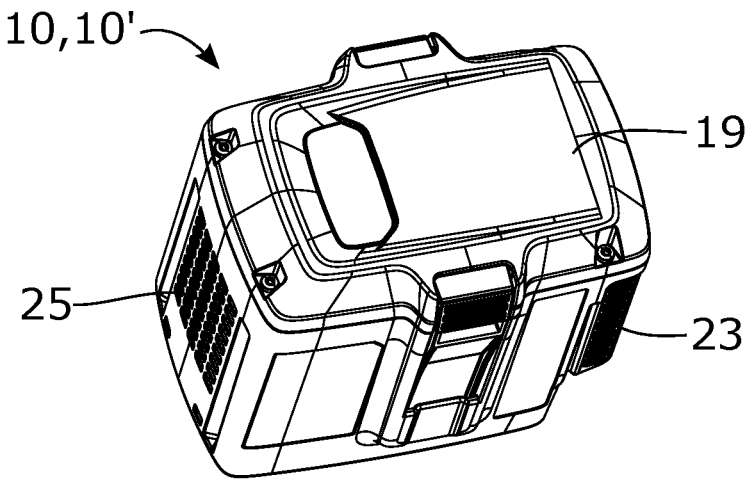
FIG. 3 illustrates an enlarged view of the cross section illustrated in FIG. 2.
FIG. 4 illustrates a battery unit according to some embodiments of the present disclosure.

FIG. 3 illustrates an enlarged view of the cross section illustrated in FIG. 2. As is indicated in FIG. 3, the first end portion 13 of the first air cooling channel 11 has an opening direction d1 angled relative to the flow direction fd. According to the illustrated embodiments, an angle a1 between the flow direction fd and the opening direction d1 of the first end portion 13 is approximately 45 degrees. Due to the angle a1, an improved ejection effect is provided on the first end portion 13 which assists in providing the flow of air through the first air cooling channel 11 during operation of the blower 1 in a manner having a low impact on the airflow through the fan housing 3. According to further embodiments, the angle a1 between the flow direction fd and the opening direction d1 of the first end portion 13 may be within the range of 5 to 80 degrees, or within the range of 25 to 65 degrees.

Moreover, as is indicated in FIG. 3, the first end portion 33 of the second air cooling channel 31 has an opening direction d2 angled relative to the flow direction fd. According to the illustrated embodiments, an angle a2 between the flow direction fd and the opening direction d2 of the first end portion 33 of the second air cooling channel 31 is approximately 45 degrees. Due to the angle a1, an improved ejection effect is provided on the first end portion 33 of the second air cooling channel 31 which assists in providing the flow of air through the second air cooling channel 31 during operation of the blower 1 in a manner having a low impact on the airflow through the fan housing 3. According to further embodiments, the angle a2 between the flow direction fd and the opening direction d2 of the first end portion 33 of the second air cooling channel 31 may be within the range of 5 to 80 degrees, or within the range of 25 to 65 degrees.

The opening directions d1, d2 of the first end portions 13, 33 may be defined as directions d1, d2 coinciding with flow directions of air through the respective the first end portions 13, 33 obtained when air is forced through the first and second end portions 13, 33 and there is no flow of air through the fan housing 3 generated by the fan 5.

FIG. 4 illustrates a battery unit 10, 10' according to some embodiments of the present disclosure. According to the illustrated embodiments, the battery unit 10, 10' is a battery pack comprising a battery housing 19 and a number of battery cells arranged in the battery housing 19, as is further explained herein. Therefore, throughout this disclosure, the wording "battery unit" may be replaced by the wording "battery pack". The battery unit 10, 10' comprises electrical contacts arranged to mate with electrical contacts 12, 32 of the first or second battery accommodation space 9, 29, indicated in FIG. 1, when the battery unit 10, 10' is arranged in the first or second battery accommodation space 9, 29. In this manner, the battery unit 10, 10' can supply electricity to the electric motor 7 via the electrical contacts 12, 32 of the first or second battery accommodation space 9, 29, indicated in FIG. 2. The battery unit 10, 10' is thus removably arrangeable at a predetermined orientation in the first battery accommodation space 9 and in the second battery accommodation space 29 to supply electricity to the electric motor. The electrical contacts of the battery unit 10, 10' are not indicated in FIG. 4 for the reason of brevity and clarity.

Figure 5:
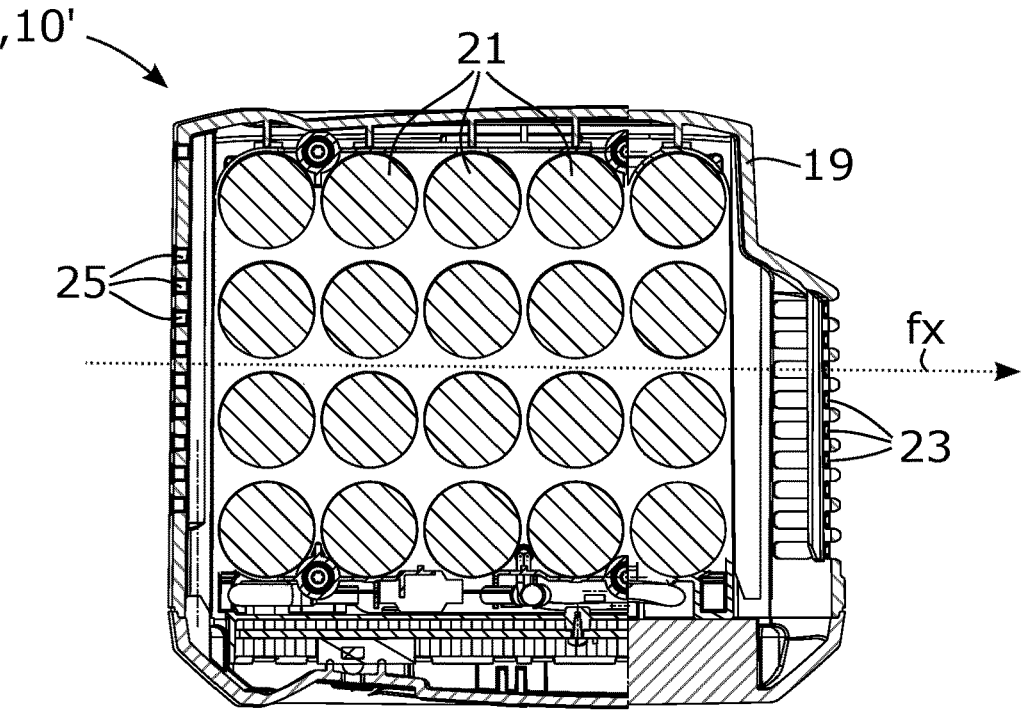
FIG. 5 illustrates a cross section through the battery unit illustrated in FIG. 4.

FIG. 5 illustrates a cross section through the battery unit 10, 10' illustrated in FIG. 4. As can be seen in FIG. 5, the battery unit 10, 10' comprises a number of battery cells 21 arranged in the battery housing 19. The battery unit 10, 10' may comprise rechargeable battery cells 21, such as for example lithium-ion battery cells. The battery cells 21 are arranged at a distance from each other such that gaps are formed between adjacent battery cells 21 of the battery unit 10, 10'.

The following is explained with simultaneous reference to FIG. 2, FIG. 4 and FIG. 5. As can be seen in FIG. 4 and in FIG. 5, the battery housing 19 comprises a set of openings 23. The openings 23 are configured to superimpose the second end portion 15, 35 of the first or second air cooling channel 11, 31 when the battery unit 10, 10' is arranged at a predetermined orientation in the first or second battery accommodation space 9, 29. That is, the openings 23 are configured to superimpose the second end portion 15 of the first air cooling channel 11 when the battery unit 10, 10' is arranged at the predetermined orientation in the first battery accommodation space 9, indicated in FIG. 2. Likewise, the openings 23 are configured to superimpose the second end portion 35 of the second air cooling channel 31 when the battery unit 10, 10' is arranged at the predetermined orientation in the second battery accommodation space 29, indicated in FIG. 2.

Moreover, as is indicated in FIG. 4 and FIG. 5, the battery housing 19 comprises a set of further openings 25 arranged at a distance from the set of openings 23 being configured to superimpose a second end portion 15, 35 of an air cooling channel 11, 31. According to the illustrated embodiments, the set of further openings 25 are arranged at an opposite side of the battery unit 10, 10' as compared to the set of openings 23 being configured to superimpose a second end portion 15, 35 of an air cooling channel 11, 31. In this manner, an air flow fx is obtained through the battery housing 19 when the battery unit 10, 10' is arranged in a battery accommodation space 9, 29 and the debris blower 1 is operated. That is, according to the illustrated embodiments, an air flow fx is obtained into the battery housing 19 via the further openings 25 and out from the battery housing 19 via the set of openings 23 into a second end portion 15, 35 of an air cooling channel 11, 31 into which the battery unit 10, 10' is arranged. Accordingly, due to these features, an efficient cooling is provided of the battery cells 21 of the battery unit 10, 10' and an overheating of the battery unit 10, 10' is avoided in an efficient manner.

Figure 6:
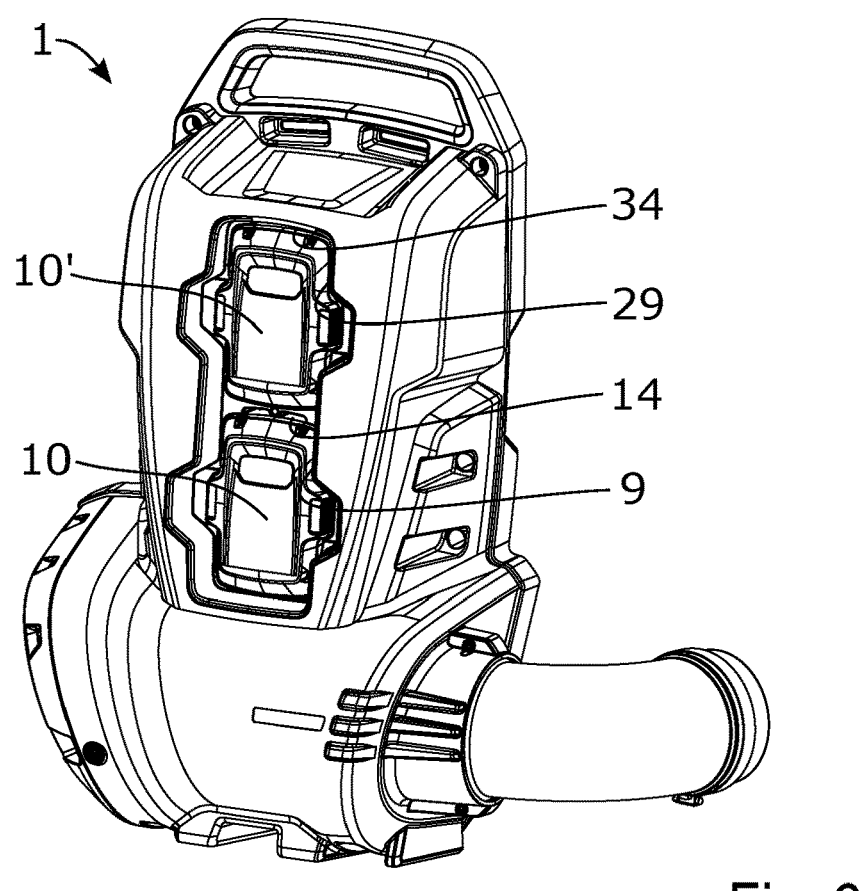
FIG. 6 illustrates a perspective view of a debris blower according to the embodiments illustrated in FIG. 1-FIG. 3 with a first battery unit and a second battery unit.

FIG. 6 illustrates a perspective view of a debris blower 1 according to the embodiments illustrated in FIG. 1-FIG. 3 comprising a first battery unit 10 and a second battery unit 10'. The first battery unit 10 is removably arranged at a predetermined orientation in the first battery accommodation space 9 and the second battery unit 10' is removably arranged at a predetermined orientation in the second battery accommodation space 29. According to the illustrated embodiments, the first and second battery units 10, 10' are of identical design. Therefore, the battery unit 10, 10' illustrated in FIG. 4 and FIG. 5 can be referred to as a first battery unit 10 as well as a second battery unit 10'.

As can be seen in FIG. 1 and FIG. 6, the respective first and second battery accommodation spaces 9, 29 comprises an open face. Moreover, as is indicated in FIG. 1, each of the first and second battery accommodation spaces 9, 29 comprises recesses 14, 34 provided in a delimiting wall of the battery accommodation space 9, 29. The recesses 14, 34 are arranged on an opposite side of the respective first and second battery accommodation space 9, 29 as compared to the second end portion 15, 35 at the battery accommodation space 9, 29, as can be seen in FIG. 1. The recesses 14, 34 are configured to superimpose the further openings 25 of the battery unit 10, 10' illustrated in FIG. 4, FIG. 5, and FIG. 6. The recesses 14, 34 functions as air inlet apertures when a battery unit 10, 10' is arranged in the battery accommodation space 9, 29. In this manner, it is ensured that air can flow in an efficient manner into the further openings 25 of the battery unit 10, 10 via the recesses 14, 34 of the respective battery accommodation space 9, 29.

As explained herein, according to the illustrated embodiments, the debris blower 1 comprises two battery accommodation spaces 9, 29 and two air cooling channels 11, 31. However, according to further embodiments of the present disclosure, the debris blower 1 may comprise another number of battery accommodation spaces 9, 29 and air cooling channels 11, 31, such as one, three, four, or the like. According to such embodiments, the battery accommodation space/spaces and the air cooling channel/channels may comprise the same features, functions, and advantages, as the first and second battery accommodation spaces 9, 29 and first and second air cooling channels 11, 31 described herein.

Moreover, as explained herein, according to the illustrated embodiments, an airflow is generated in a direction from the second end portion 15, 35 towards the first end portion 13, 33 of the first and second air cooling channels 11, 31. However, according to further embodiments of the present disclosure, the first end portion 13, 33 of the first and second air cooling channels 11, 31 may be designed, and/or adapted, to generate an airflow in a direction from the first end portion 13, 33 towards the second end portion 15, 35 through the first and second air cooling channels 11, 31.

Furthermore, according to some embodiments of the present disclosure, the debris blower 1 is operable with suction at the nozzle instead of an air flow exiting the nozzle. This may be achieved by running the fan 5 in an opposite operational direction as described with reference to FIG. 1, or by changing the flow path through the blower to create a reversed flow direction at the nozzle. According to such embodiments, the debris blower 1 may also be referred to as a debris blower/vacuum, or simply debris vacuum or leaf vacuum.

The wording "substantially parallel to", as used herein, may encompass that the angle between the items referred to is less than 7 degrees.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A debris blower comprising:
   a fan housing,
   a fan configured to generate a first airflow through the fan housing,
   an electric motor configured to power the fan,
   a first battery accommodation space configured to accommodate a first battery unit for supply of electricity to the electric motor, and
   a first air cooling channel fluidly connecting the first battery accommodation space and the fan housing,
   wherein the first airflow through the fan housing flows from an air inlet to an air outlet in a linear flow direction extending parallel to an axis of rotation of the fan,
   wherein the first air cooling channel comprises a first channel inlet at the first battery accommodation space and a first channel outlet at the fan housing,
   wherein the first battery unit is a battery pack comprising a battery housing and a number of battery cells arranged in the battery housing,
   wherein the battery housing comprises a first opening arranged to align with the first channel inlet responsive to the battery pack operably coupling to the first battery accommodation space,
   wherein the battery housing comprises a second opening arranged at an opposite end of the battery housing from the first opening,
   wherein the first battery accommodation space comprises a recess arranged to superimpose the second opening of the battery housing, and
   wherein a second airflow flows into the first battery accommodation space via the recess prior to flowing into the battery housing via the second opening, through the battery housing, out of the battery housing through the first opening, into the first air cooling channel via the first channel inlet, out of the first air cooling channel via the first channel outlet, and joins the first airflow in the fan housing.

2. The blower according to claim 1, wherein the first channel outlet is positioned in the fan housing to provide the second airflow through the first channel outlet during operation of the blower.

3. The blower according to claim 1, wherein the fan is arranged in the fan housing, and wherein the first channel outlet is positioned at a suction side of the fan housing.

4. The blower according to claim 1, wherein the fan is configured to generate the first airflow having the linear flow direction through the fan housing, and wherein the first channel outlet has an opening direction angled relative to the linear flow direction to provide the second airflow through the first air cooling channel during operation of the blower.

5. The blower according to claim 4, wherein an angle between the linear flow direction and the opening direction of the first channel outlet is within the range of 5 to 80 degrees.

6. The blower according to claim 1, wherein the first battery unit is removably arrangeable at a predetermined orientation in the first battery accommodation space.

7. A debris blower comprising:

a fan housing, a fan configured to generate a first airflow through the fan housing, an electric motor configured to power the fan, a first battery accommodation space configured to accommodate a first battery unit for supply of electricity to the electric motor, and a first air cooling channel fluidly connecting the first battery accommodation space and the fan housing, wherein the first air cooling channel comprises a first channel inlet at the first battery accommodation space and a first channel outlet at the fan housing, wherein the first battery unit is a battery pack comprising a battery housing and a number of battery cells arranged in the battery housing, wherein the battery housing comprises a first opening arranged to align with the first channel inlet responsive to the battery pack operably coupling to the first battery accommodation space, wherein the battery housing comprises a second opening arranged at an opposite end of the battery housing from the first opening, wherein the first battery accommodation space comprises a recess arranged to superimpose the second opening of the battery housing, and wherein a second airflow flows into the first battery accommodation space via the recess prior to flowing into the battery housing via the second opening, through the battery housing, out of the battery housing through the first opening, into the first air cooling channel via the first channel inlet, out of the first air cooling channel via the first channel outlet, and joins the first airflow in the fan housing.

8. A debris blower comprising:

a fan housing, a fan configured to generate a first airflow through the fan housing, an electric motor configured to power the fan, a first battery accommodation space configured to accommodate a first battery unit for supply of electricity to the electric motor, a second battery accommodation space configured to accommodate a second battery unit for supply of electricity to the electric motor, a first air cooling channel fluidly connecting the first battery accommodation space and the fan housing, and a second air cooling channel fluidly connecting the second battery accommodation space and the fan housing, wherein the first airflow through the fan housing flows from an air inlet to an air outlet in a linear flow direction extending parallel to an axis of rotation of the fan, wherein the first air cooling channel comprises a first channel inlet at the first battery accommodation space and a first channel outlet at the fan housing, wherein the second air cooling channel comprises a second channel inlet at the second battery accommodation space and a second channel outlet at the fan housing, wherein the first battery unit is a first battery pack comprising a first battery housing and a first number of battery cells arranged in the first battery housing, wherein the second battery unit is a second battery pack comprising a second battery housing and a second number of battery cells arranged in the second battery housing, wherein the first and second battery housings comprise a first opening arranged to align with the first and second channel inlets, respectively, responsive to the first and second battery packs operably coupling to the first and second battery accommodation spaces, respectively, wherein the first and second battery housings comprise a second opening arranged at an opposite end of the first and second battery housings from the first opening, wherein the first battery accommodation space comprises a first recess arranged to superimpose the second opening of the first battery housing and the second battery accommodation space comprises a second recess arranged to superimpose the second opening of the second battery housing, wherein a second airflow flows into the first battery accommodation space via the first recess prior to flowing into the first battery housing via the second opening, through the first battery housing, out of the first battery housing through the first opening, into the first air cooling channel via the first channel inlet, out of the first air cooling channel via the first channel outlet, and joins the first airflow in the fan housing, and wherein a third airflow flows into the second battery accommodation space via the second recess prior to flowing into the second battery housing via the second opening, through the second battery housing, out of the second battery housing through the first opening, into the second air cooling channel via the second channel inlet, out of the second air cooling channel via the second channel outlet, and joins the first and second airflows in the fan housing.

9. The blower according to claim 8, wherein the first battery unit is removably arrangeable at a predetermined orientation in the second battery accommodation space.

10. The blower according to claim 8, wherein the second air cooling channel is separate from the first air cooling channel.

11. The blower according to claim 8, wherein the second channel outlet is positioned in the fan housing to provide the third airflow through the second channel outlet during operation of the blower.

12. The blower according to claim 8, wherein the fan is arranged in the fan housing, and wherein the second channel outlet is positioned at a suction side of the fan housing.

13. The blower according to claim 8, wherein the second channel outlet has an opening direction angled relative to the linear flow direction to provide the third airflow through the second air cooling channel during operation of the blower.

14. The blower according to claim 13, wherein an angle between the linear flow direction and the opening direction of the second channel inlet is within the range of 5 to 80 degrees.

15. The blower according to claim 8, wherein the second battery unit is removably arrangeable at a predetermined orientation in the second battery accommodation space.

16. The blower according to claim 8, wherein the second air cooling channel is at least twice as long as the first air cooling channel.

17. The blower according to claim 8, wherein the second air cooling channel extends beyond the first battery accommodation space and the first air cooling channel.

18. The blower according to claim 8, wherein the first and second channel inlets are structurally identical to each other to enable the first and second battery units to be interchangeable between the first and second battery accommodation spaces, and wherein the second channel outlet is disposed further into a suction side of the fan housing than the first channel outlet.

* * * * *